Figure 1:
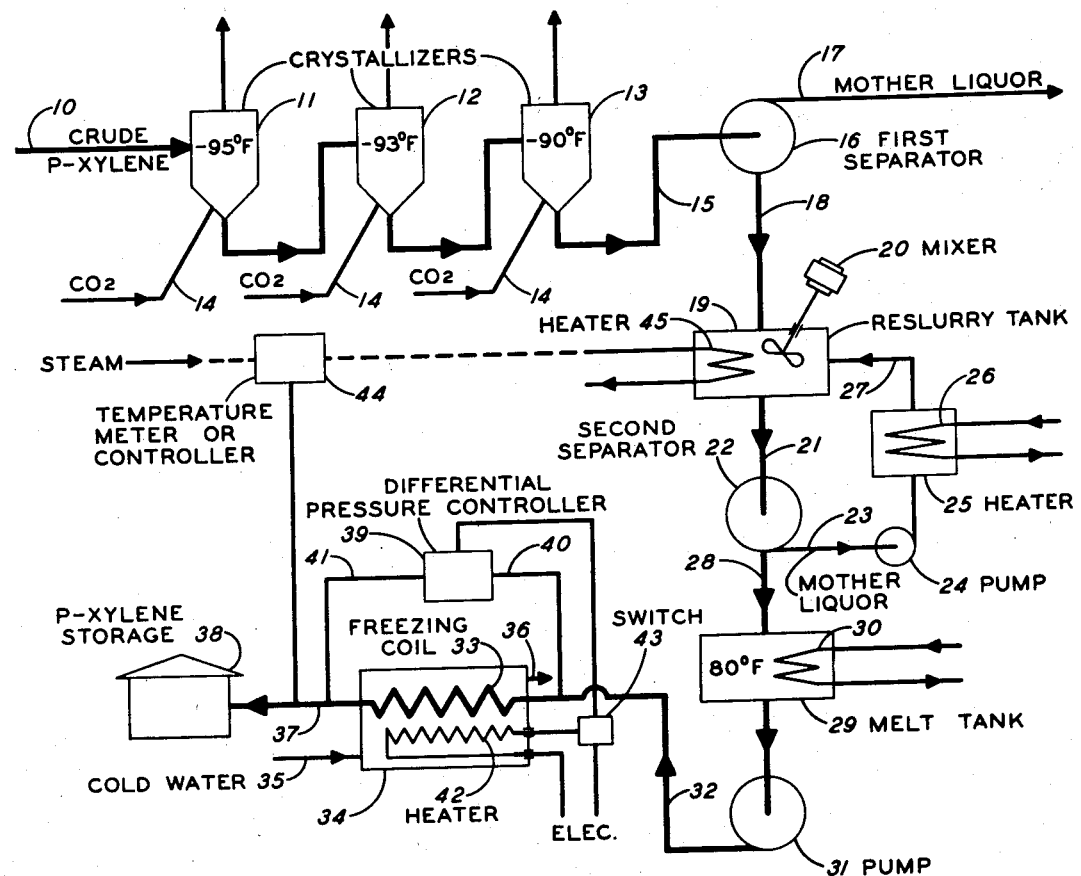

INVENTORS
ROBERT L. LeTOURNEAU
ROBERT MATTESON
VICTOR WAITHMAN

United States Patent Office 2,750,433
Patented June 12, 1956

2,750,433

HYDROCARBON ANALYSIS AND CONTROL IN CRYSTALLIZATION PROCESSES

Robert L. Le Tourneau, Richmond, and Robert Matteson and Victor Waithman, Berkeley, Calif., assignors to California Research Corporation, San Francisco, Calif., a corporation of Delaware Application March 20, 1951, Serial No. 216,628

1 Claim. (Cl. 260—674)

This invention relates to methods and apparatus for liquid hydrocarbon analysis and control and particularly refers to the continuous determination of the proportion of a liquid hydrocarbon fraction, for example, benzene or one of the xylene isomers, in a mixture of that fraction with small percentages of other similar hydrocarbons in a manufacturing, purification, or refining process. The determination thus obtained may either be indicated as a proportion or percentage or may be utilized automatically to control one or more process steps to maintain a predetermined product purity.

The determination of purity of hydrocarbons by measurements of freezing points is described in Journal of Research, U. S. National Bureau of Standards, R. P. 1676, by A. R. Glasgow, Jr., A. J. Streiff and F. D. Rossini, November, 1945, and in the A. S. T. M. Tentative Method D–1016–50T issued 1949, revised 1950. This invention utilizes hydrocarbon freezing point-purity characteristics in a novel procedure and apparatus and is based in general on the fact that, in a mixture of organic liquid materials, particularly of the class exemplified by aromatic liquid hydrocarbons such as benzene and the several xylene isomers and consisting of a high percentage (80–100%) of component A with a low percentage (0–20%) of other and similar components B, the freezing points of mixtures containing increasing amounts of the B components fall on a curve which is substantially a straight line and is of substantially the same slope regardless of the nature and freezing point characteristics of the B components.

Other materials of this nature to which this method and apparatus are applicable for indication of purity and control of process steps to control purity are as follows:

1. n-Pentane
2. Isopentane
3. n-Hexane
4. n-Heptane
5. 2,2,4-trimethylpentane
6. Methylcyclohexane
7. 1,2-butadiene
8. Isoprene (2-methyl-1,3-butadiene)
9. Toluene (methylbenzene)
10. Ethylbenzene
11. Styrene This invention comprehends broadly methods and apparatus for analyzing or controlling a liquid hydrocarbon stream by continuously and cyclically varying its temperature within a narrow range above and below the freezing point of the specific component A, which is to be determined or controlled and is present in large proportion (90–100%) and utilizing the temperature of the liquid stream either to indicate or to control its purity by appropriate operative process steps and equipment therefor.

It is an object of this invention to provide an improved method and apparatus for analyzing a liquid hydrocarbon stream, for example containing 90% plus of an aromatic such as paraxylene in a mixture with ethyl benzene and meta- and orthoxylenes.

Another object is to provide an improved method of controlling the purity of a liquid hydrocarbon stream.

Another object is to provide an automatically operating hydrocarbon analysis procedure that will have a high sensitivity in the purity range to be measured.

These and other objects and advantages will be further apparent from the following description and the attached drawing which forms a part of this specification and illustrates a preferred embodiment of the invention.

In the drawing, Figure 1 is a diagrammatic representation of a method and apparatus for continuously analyzing and, if desired, controlling the purity of product of a paraxylene purifying operation.

Figure 2:
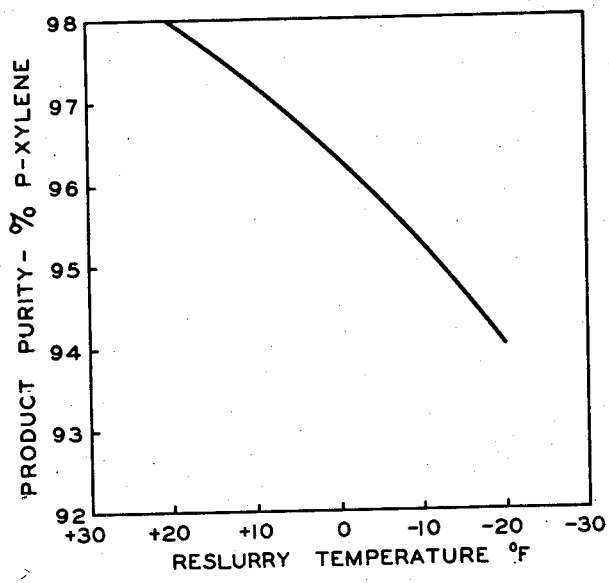

Figure 2 is a chart showing the variation of product purity with the temperature in one step of the illustrated process of producing high purity paraxylene.

Referring to Figure 1, reference numeral 10 designates a conduit for crude paraxylene from any desired source, for example, that produced from a coal tar xylene fraction or a xylene-rich fraction of catalytically reformed petroleum naphtha. With the paraxylene may be small proportions (up to about 4–10%) of meta- and orthoxylene and ethyl benzene. In the process illustrated this mixture passes successively through crystallizers 11, 12 and 13, wherein the temperature is lowered by any suitable refrigerant, for example carbon dioxide introduced through conduits 14. The slurry of paraxylene and uncrystallized mother liquor leaves the last crystallizer through conduit 15 and passes into the first separator 16, where, as by centrifugal action, the mother liquor is separated and is removed through outlet 17. The paraxylene crystals pass from separator 16 through conduit 18 to a reslurry tank 19 in which is a mixer 20.

The reslurried paraxylene passes from tank 19 through conduit 21 into the second or final separator 22 from which mother liquor is separated, as by centrifugal action, and passes from outlet 23 through pump 24 and heater 25, the latter provided with a heating unit such as steam coil 26. From heater 25 the warmed mother liquor passes through conduit 27 to the reslurry tank 19 just described.

Paraxylene crystals of about 90–100% purity pass from the second separator 22 through conduit 28 to a melt tank 29, provided with a heater such as steam coil 30. The purified paraxylene, with a few per cent of remaining impurities, is raised to about 80° F. in tank 29, thus liquefying all of its components. From tank 29 the liquid stream passes through pump 31 and conduit 32 to what we prefer to term a "freezing coil" 33 surrounded by a cooling bath in tank 34 having a cold water inlet 35 and a waste or overflow outlet 36. From coil 33 the liquid stream passes through conduit 37 to product tank 38. Alternatively, instead of passing the entire stream of product through coil 33, the latter may be mounted in a bypass so that only a representative sample of the paraxylene product passes through the coil. The process equipment is illustrated only diagrammatically without showing the numerous valves, liquid level, flow, pressure and temperature controllers and the like which are conventional and do not require description or discussion here.

Associated with freezing coil 33 is a differential pressure controller 39 having, in this example, an upstream connection 40 and a downstream connection 41. Alternatively, if either conduits 32 or 37 are under constant pressure, only a single connection would be required. The objective is to provide means responsive to the pressure drop across coil 33 due to liquid flow therethrough for a purpose which will be pointed out in detail below. Controller 39 is adapted to turn on and off a heating unit such as electric heating coil 42 in bath 34, and in this example carries out this function by means of switch 43 for the electric power source shown. The controller 39 is adjusted and the cold water temperature and flow rate are so proportioned that the temperature of coil 33 is varied by a small amount, for example about 0.2–0.5° F. above and below the freezing point of the desired component of the liquid stream in this case paraxylene, whose purity is to be indicated or controlled.

When the temperature of coil 33 is below the freezing point of the paraxylene a layer of the latter will build up on the inner surface of the coil, thus partially obstructing the flow of liquid and increasing the pressure differential across the coil. When this differential increases to a predetermined maximum, controller 39 actuates switch 43 energizing heating unit 42 and raising the temperature of bath 34. This in turn raises the coil 33 temperature melting off or at least reducing the thickness of the solid paraxylene on the inner surface of the coil, thereby reducing the obstruction to liquid flow and also reducing the pressure differential to a point where controller 39 opens switch 43, after which the lower temperature of water 35 reduces the temperature of the coil to repeat the cycle. Desirably coil 33 and bath 34 are of small dimensions to reduce their heat capacity so that a slight change in temperature will add or subtract the heat of fusion required to change the paraxylene layer from a liquid to a solid, and vice versa. In practice, it has been found necessary to vary the coil temperature only a fraction of a degree, for example about 0.2–0.5° F. to obtain a high degree of analysis accuracy, which will now be discussed.

It will be evident from the foregoing that the temperature of the liquid product stream leaving coil 33 through conduit 37 will be substantially at its freezing point. In view of the relationship between freezing point and purity of this component, as shown in the publications cited, it is only necessary continuously to indicate or record the stream temperature at that point, which is done in this example by the indicating or recording meter 44, which may be calibrated directly in terms of per cent paraxylene.

If it is desired to control the purity of the product stream, this may conveniently be done by utilizing a temperature-responsive controller for meter 44 and, in this process, controlling therewith the temperature of the re-slurry tank 19 by a heater 45 placed therein and supplied with steam as shown. The relation between product purity, expressed as per cent paraxylene, with re-slurry tank temperature in the process illustrated in this example is shown by the curve of Figure 2.

Although only one physical embodiment of this method has been described and the apparatus therefor illustrated, it is obvious that it could be applied to other circumstances and the control of other products having analogous properties, for example benzene and others listed above, and that other types of separation or purification control steps could be used, for example that of fractional distillation, in which reflux ratios, temperatures, etc. could be modified by known methods and means. Accordingly, all such modifications and changes as are included within the scope of the appended claims are considered to be embraced thereby.

We claim:

In a method of separating paraxylene from a mixture of it with ethyl benzene and ortho- and metaxylene including the steps of forming paraxylene crystals at low temperature, separating said crystals from uncrystallized liquid and reslurrying said crystals with liquid from a subsequent separation, the steps of liquefying paraxylene crystals from said last-named separation, passing said liquid at a constant flow rate in a confined path through a cooling zone, cyclically decreasing and increasing the temperature of said zone from just below to just above the freezing point of the liquid paraxylene in the confined path to deposit a layer of paraxylene therein and to melt said layer to keep the pressure differential along said zone within a predetermined range, determining the temperature of the liquid leaving said zone and increasing the temperature of said reslurrying step when said liquid temperature decreases.

References Cited in the file of this patent

UNITED STATES PATENTS

| | | |
|---|---|---|
| 2,427,042 | Bowman | Sept. 9, 1947 |
| 2,466,696 | Friswold et al. | Apr. 12, 1949 |
| 2,511,711 | Hetzner et al. | June 13, 1950 |
| 2,541,682 | Arnold | Feb. 13, 1951 |
| 2,591,084 | Martin | Apr. 1, 1952 |

OTHER REFERENCES

Glasgow et al.: Jour. Research Nat. Bu. Standard, vol. 35, pages 335–72 (1945). Page 367–8, and 360–2, only needed.

Perry: "Chemical Engineers Handbook," 3rd ed., 1329–1336, McGraw-Hill Publishing Co. (1950).